(12) United States Patent
Cieler et al.

(10) Patent No.: US 8,314,693 B2
(45) Date of Patent: Nov. 20, 2012

(54) DEVICE FOR DISPLAYING A PLURALITY OF DETECTABLE VARIABLE QUANTITIES

(75) Inventors: Stephan Cieler, Frankfurt (DE); Katrin Lübbert, Darmstadt (DE); Guido Meier-Arendt, Langen (DE); Carmen Solterbeck, Frankfurt (DE)

(73) Assignee: Continental GmbH, Hannover (DE)

( * ) Notice: Subject to any disclaimer, the term of this patent is extended or adjusted under 35 U.S.C. 154(b) by 424 days.

(21) Appl. No.: 12/713,521

(22) Filed: Feb. 26, 2010

(65) Prior Publication Data

US 2011/0050408 A1    Mar. 3, 2011

(30) Foreign Application Priority Data

Feb. 27, 2009 (DE) .......................... 10 2009 010 810

(51) Int. Cl.
*B60Q 1/50* (2006.01)
*B60Q 1/00* (2006.01)
*G09F 9/00* (2006.01)

(52) U.S. Cl. ........ 340/464; 340/456; 340/441; 340/461; 340/439; 340/438; 340/425.5; 340/457; 340/459

(58) Field of Classification Search .................. 340/464, 340/456, 441, 461, 439, 438, 425.5, 457, 340/459
See application file for complete search history.

(56) References Cited

U.S. PATENT DOCUMENTS

| | | | |
|---|---|---|---|
| 3,934,364 A | 1/1976 | Kuehn | |
| 4,490,127 A * | 12/1984 | Matsumoto et al. | 474/110 |
| 4,622,637 A * | 11/1986 | Tomita et al. | 701/64 |
| 4,623,870 A * | 11/1986 | Irimajiri et al. | 340/439 |
| 4,631,515 A * | 12/1986 | Blee et al. | 340/439 |
| 4,663,718 A * | 5/1987 | Augello et al. | 701/527 |
| 4,862,395 A * | 8/1989 | Fey et al. | 702/146 |
| 5,309,139 A * | 5/1994 | Austin | 340/462 |
| 5,422,625 A * | 6/1995 | Sakaemura | 340/461 |
| 5,457,439 A | 10/1995 | Kuhn | |
| 5,459,666 A * | 10/1995 | Casper et al. | 701/123 |
| 5,546,305 A * | 8/1996 | Kondo | 340/576 |
| 5,686,895 A * | 11/1997 | Nakai et al. | 340/636.1 |
| 5,880,710 A * | 3/1999 | Jaberi et al. | 345/618 |
| 5,916,298 A * | 6/1999 | Kroiss et al. | 701/123 |
| 6,140,917 A * | 10/2000 | Branson | 340/461 |
| 6,289,332 B2 * | 9/2001 | Menig et al. | 180/167 |
| 6,412,187 B1 * | 7/2002 | Sasaki et al. | 33/784 |
| 6,480,105 B2 * | 11/2002 | Edwards | 340/457 |
| 6,480,106 B1 * | 11/2002 | Crombez et al. | 340/461 |
| 6,580,984 B2 * | 6/2003 | Fecher et al. | 701/36 |
| 6,600,413 B1 * | 7/2003 | Lo | 340/439 |
| 6,625,562 B2 * | 9/2003 | Hayashi et al. | 702/145 |
| 6,748,319 B2 * | 6/2004 | Aoki et al. | 701/527 |

(Continued)

FOREIGN PATENT DOCUMENTS

DE    2 255 904 B    5/1974

(Continued)

*Primary Examiner* — Daniel Wu
*Assistant Examiner* — Kam Ma
(74) *Attorney, Agent, or Firm* — Cozen O'Connor

(57) ABSTRACT

A device for displaying a plurality of detectable variable quantities of a motor vehicle that are in a ratio to one another, each quantity represented by a band, and the bands being arranged relative to one another such that they form a variable geometric figure. The bands have a variable length depending on the deviation from an optimum ratio of the quantities to one another, and intersect in an intersection area.

16 Claims, 3 Drawing Sheets

U.S. PATENT DOCUMENTS

| | | | |
|---|---|---|---|
| 6,774,773 B2 * | 8/2004 | Funayose et al. | 340/441 |
| 6,781,512 B2 * | 8/2004 | Hayashi et al. | 340/456 |
| 6,794,853 B2 * | 9/2004 | Kondo | 320/132 |
| 6,844,811 B2 * | 1/2005 | Hayashi et al. | 340/441 |
| 7,024,306 B2 * | 4/2006 | Minami et al. | 701/123 |
| 7,073,125 B1 * | 7/2006 | Nystrom et al. | 715/703 |
| 7,079,018 B2 * | 7/2006 | Hottebart et al. | 340/442 |
| 7,091,839 B2 * | 8/2006 | Situ et al. | 340/438 |
| 7,262,689 B2 * | 8/2007 | Kolpasky | 340/461 |
| D563,977 S * | 3/2008 | Carl et al. | D14/488 |
| 7,380,215 B2 * | 5/2008 | Nystrom et al. | 715/772 |
| 7,675,404 B2 * | 3/2010 | Kanzaka | 340/441 |
| 7,726,255 B2 * | 6/2010 | Nakamichi | 116/62.4 |
| 7,898,405 B2 * | 3/2011 | Burke et al. | 340/461 |
| 8,026,801 B2 * | 9/2011 | Saito et al. | 340/441 |
| 8,055,419 B2 * | 11/2011 | Meng | 701/64 |
| 2002/0154003 A1 * | 10/2002 | Ueda | 340/425.5 |
| 2003/0164756 A1 * | 9/2003 | Hayashi et al. | 340/439 |
| 2004/0093129 A1 * | 5/2004 | Majstorovic et al. | 701/1 |
| 2005/0174226 A1 * | 8/2005 | Heyden et al. | 340/461 |
| 2007/0115107 A1 * | 5/2007 | Kageyama et al. | 340/461 |
| 2008/0258892 A1 * | 10/2008 | Itoh et al. | 340/441 |
| 2009/0128313 A1 * | 5/2009 | Lux | 340/441 |
| 2009/0251303 A1 * | 10/2009 | Kaneda | 340/439 |
| 2009/0273459 A1 * | 11/2009 | Crave et al. | 340/441 |
| 2010/0079367 A1 * | 4/2010 | Yokota et al. | 345/102 |
| 2010/0253496 A1 * | 10/2010 | Nishikawa et al. | 340/441 |
| 2010/0259374 A1 * | 10/2010 | Matsuo et al. | 340/439 |
| 2011/0043348 A1 * | 2/2011 | Blackard et al. | 340/439 |
| 2011/0050408 A1 * | 3/2011 | Cieler et al. | 340/464 |
| 2011/0109449 A1 * | 5/2011 | Riegelman et al. | 340/441 |
| 2011/0205044 A1 * | 8/2011 | Enomoto et al. | 340/439 |
| 2011/0241865 A1 * | 10/2011 | Saito | 340/439 |

FOREIGN PATENT DOCUMENTS

| | | |
|---|---|---|
| DE | 43 17 831 C1 | 7/1994 |
| DE | 199 49 548 A1 | 4/2001 |
| DE | 100 65 602 A1 | 7/2002 |
| DE | 101 28 437 A1 | 1/2003 |
| DE | 102 49 766 A1 | 5/2004 |
| JP | 62170815 A | 7/1987 |

* cited by examiner

DEVICE FOR DISPLAYING A PLURALITY OF DETECTABLE VARIABLE QUANTITIES

BACKGROUND OF THE INVENTION

1. Field of the Invention

The invention relates to a device for displaying a plurality of detectable variable quantities of a motor vehicle that are in a ratio to one another, it being possible for each quantity to be represented by a band, the bands being arranged relative to one another in such a way that they form a variable geometric figure.

2. Description of the Related Art

It is known in the case of such a display device to represent a plurality of mutually independent displays of a plurality of detectable variable quantities by light bands that consist of individual drivable light cells. Here, the light bands are arranged relative to one another such that driven light cells of values that can theoretically be assigned to one another form to a specific geometric figure.

In this case, the quantities can be quantities specific to motor vehicles such as driving speed and/or engine speed and/or instantaneous average fuel consumption.

If the displays of these three quantities are such that the specific geometric figure lights up, it can thereby be indicated that a driving mode with optimum operating conditions is obtained with regard to fuel consumption.

The arrangement of the three displays next to one another requires a large amount of space.

SUMMARY OF THE INVENTION

It is an object of the invention to provide a display device of that conveys to an observer information that can be easily and quickly detected in conjunction with a low space requirement.

According to one embodiment of the invention by virtue of the fact that the bands each have a variable length depending on the deviation from an optimum ratio of the quantities to one another, and intersect in an intersection area.

It is thereby possible for an observer easily to detect whether the detected quantities are at a specific ratio to one another and, if not, which of the quantities deviates how sharply from the optimum and should be corrected.

In this case, the bands either can have the least length given an optimum ratio of the variable quantities to one another, or have the greatest length given an optimum ratio of the variable quantities to one another.

A symmetrical representation is obtained when the bands intersect in the middle.

The bands can have different contours. The bands can have, for example, a rectangular contour or an elliptical one.

Provide the observer information relating to an ecologically favorable driving mode, the variable quantities can be the instantaneous driving speed and/or the instantaneous engine speed and the instantaneous speed of the transmission of the motor vehicle.

The detectability of the individual quantities by the observer can be raised by virtue of the fact that the bands are of different color, the informativeness for the observer being further improved when the color or the color intensity of the bands varies depending on the respective length of the bands.

In a simple way, the bands can be represented by an opto-electronic display.

When the bands are light bands, this leads to a clearer detectability.

To provide the observer information relating to the longer-term driving behavior, a further display can be used to display the time or the kilometers traveled in the driving mode given an optimum and/or non-optimum ratio of the quantities to one another.

To this end, the time or the kilometers traveled during the optimum and/or non-optimum ratio of the quantities to one another can be represented by a bar graph.

Another possibility consists in that the time or the kilometers traveled during the optimum and/or non-optimum ratio of the quantities to one another can be represented in numerical values.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention is illustrated in the drawings and described in more detail below. In the drawings.

DETAILED DESCRIPTION OF THE PRESENTLY PREFERRED EMBODIMENTS

The figures depict a display panel of a motor vehicle with a circular speed scale 1.

The speed scale 1 surrounds a device for displaying the speed and the gear selection, which comprises two light bands 2 and 3 intersecting at right angles in the middle.

In this case, the horizontal light band 2 can represent the speed information, and the light band 3 the gear selection information.

The light bands 2 and 3 have an elliptical type contour.

The representation of the two light bands 2 and 3 can vary as to their length.

The less the length of a light band 2 and 3, the more optimum is this quantity for an ecological driving mode.

Figure 1:
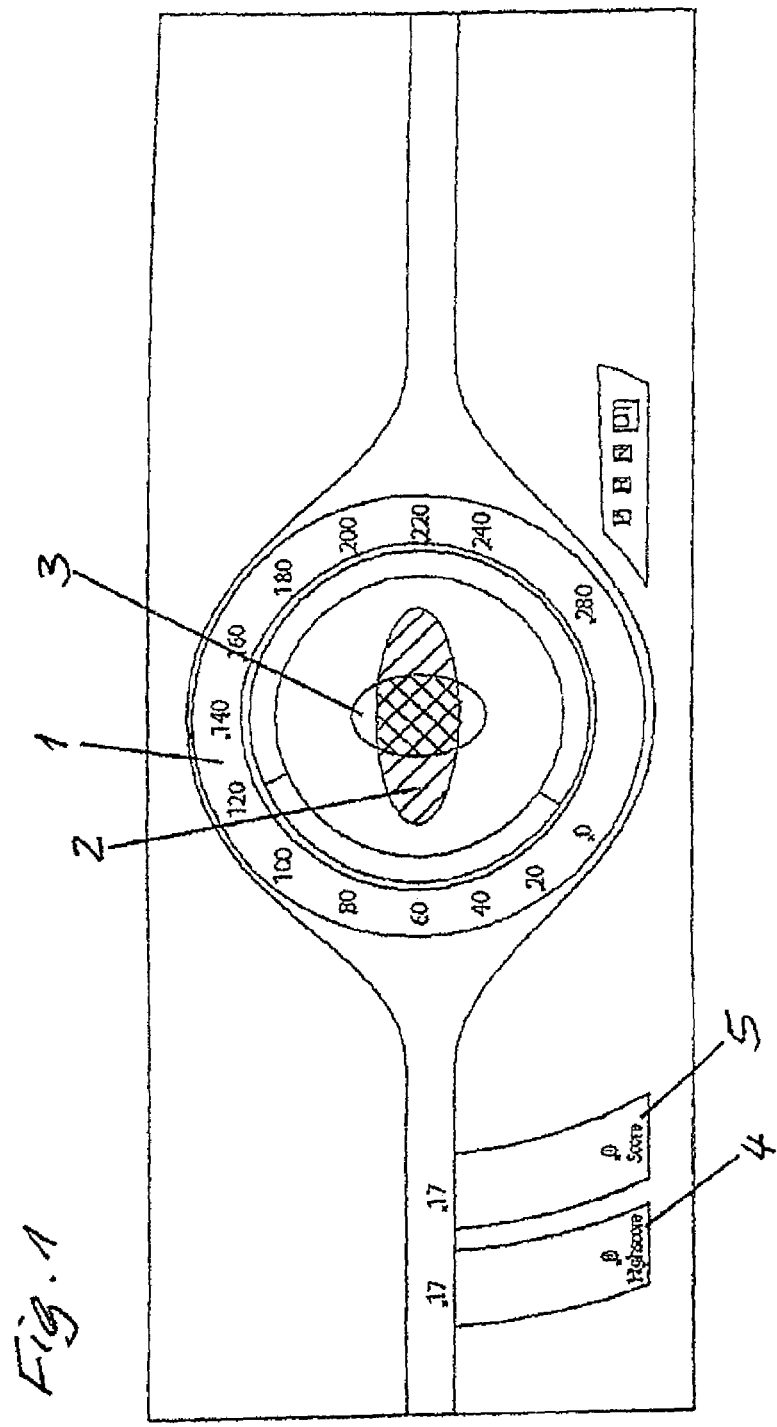
FIG. 1 is a device with a representation relating to high speed.

Thus, a long light band 2 and short light band 3 of FIG. 1 shows that the speed of the motor vehicle is too high at the moment for the selected gear.

Figure 2:
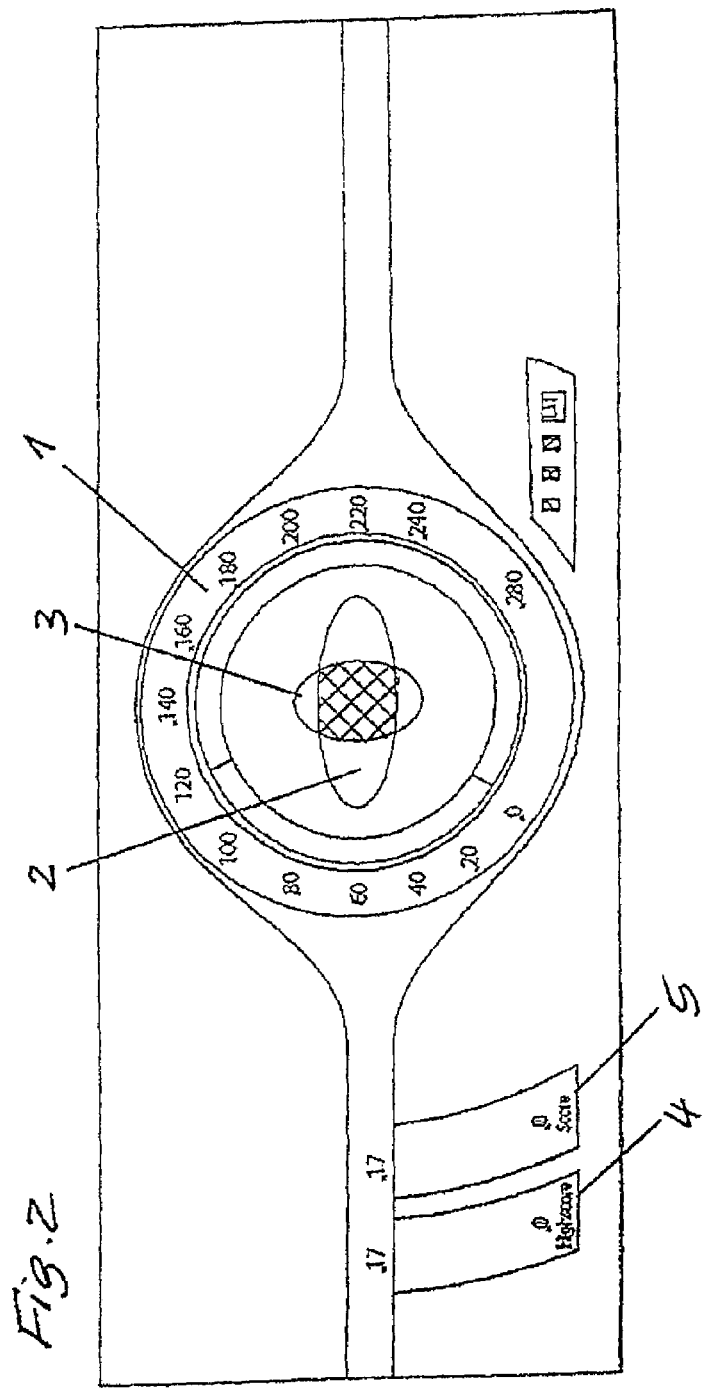
FIG. 2 is the device according to FIG. 1 with representation of an optimum ratio of the speed to the instantaneous gear selection.

FIG. 2, in which both the light band 2 and the light band 3 have the least length, indicates that the instantaneous speed is at an optimum ratio to the selected gear of the motor vehicle transmission.

Figure 3:
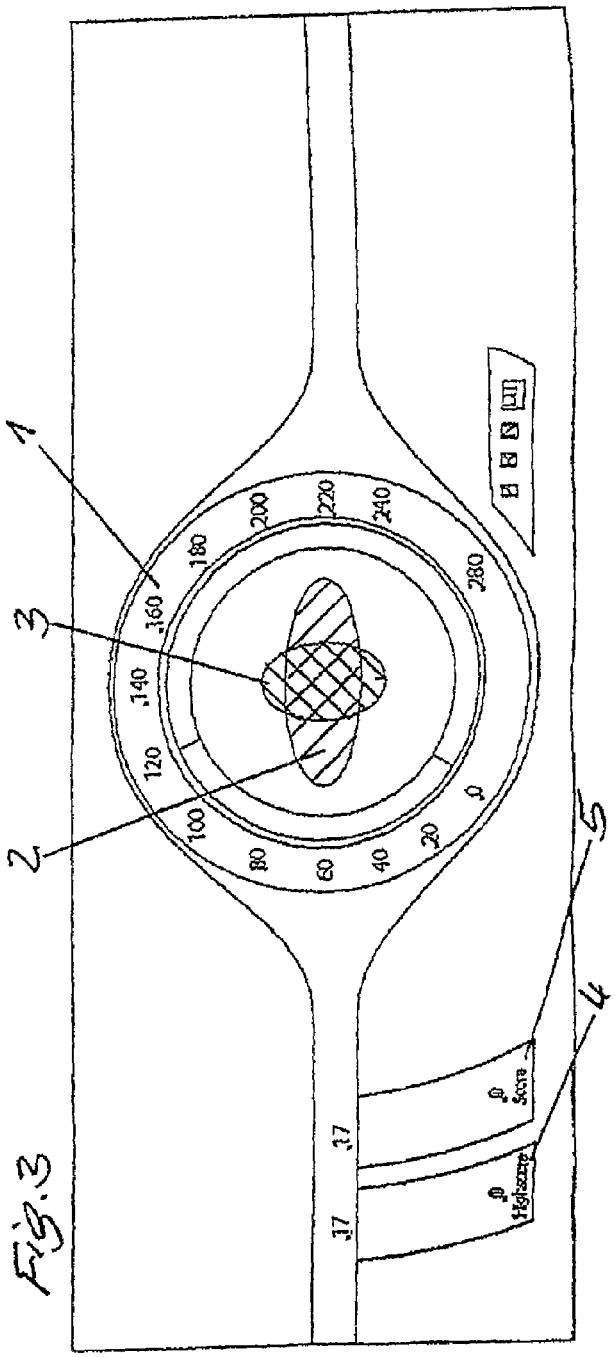
FIG. 3 is the device according to FIG. 1 with representation of suboptimum speed and gear selection.

In turn, the two long light bands 2 and 3 FIG. 3 indicate that both the speed and the selected gear are suboptimum.

To the left next to the speed scale 1 is a first bar graph display 4 and a second bar graph display 5.

The first bar graph display 4 preferably represents a summed time during which the motor vehicle is operated in conjunction with an optimum ratio of speed and gear selection to one another.

The bar graph display 5 preferably indicates a summed time during which the motor vehicle is operated given an optimum ratio of speed and gear selection. In display 5, a time during which no such optimum driving mode takes place have been subtracted.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A display device configured to display a plurality of detectable variable quantities of a motor vehicle that are in a ratio to one another, the display comprising:
    a first band configured to display a first value of a first variable, the first band having a variable length; and
    a second band configured to display a second value of a second variable, the second band having a variable length,
    the first and second bands arranged relative to one another to intersect in an intersection area to form a variable geometric figure,
    wherein the lengths of the first and second bands are based at least in part on a deviation from an optimum ratio of the first value of the first variable to the second value of the second variable and
    the variable quantities are selected from the group consisting of instantaneous driving speed, instantaneous engine speed, instantaneous speed of a transmission, and instantaneous fuel consumption.

2. The display device as claimed in claim 1, wherein the first and second bands have a least length given an optimum ratio of the variable quantities to one another.

3. The display device as claimed in claim 1, wherein the first and second bands have a greatest length given an optimum ratio of the variable quantities to one another.

4. The display device as claimed in claim 1, wherein the first and second bands intersect at respective middle portions of the first and second bands.

5. The display device as claimed in claim 1, wherein each of the first and second bands have a rectangular contour.

6. The display device as claimed in claim 1, wherein each of the first and second bands have an elliptical contour.

7. The display device as claimed in claim 1, wherein the first and second bands are of different color.

8. The display device as claimed in claim 7, wherein one of the color and a color intensity of the first and second bands varies based at least in part on respective lengths of the first and second bands.

9. The display device as claimed in claim 1, wherein the first and second bands are produced by an optoelectronic display.

10. The display device as claimed in claim 1, wherein the first and second bands are light bands.

11. The display device as claimed in claim 1, further comprising a further display configured to display at least one of a time and kilometers traveled in a driving mode based on one of an optimum and a non-optimum ratio of the values of the first and second bands to one another.

12. The display device as claimed in claim 11, wherein the at least one of the time or the kilometers traveled are represented by a bar graph.

13. The device as claimed in claim 11, wherein the at least one of the time and the kilometers traveled are represented by numerical values.

14. The display device as claimed in claim 8, wherein the first and second bands are produced by an optoelectronic display.

15. The display device as claimed in claim 14, wherein the first and second bands are light bands.

16. The display device as claimed in claim 1, wherein the first and second bands are arranged to extend substantially perpendicular to each other.

* * * * *